J. W. WAY.

AEROPLANE.

APPLICATION FILED FEB. 5, 1912.

Reissued Apr. 2, 1912. 13,397.

WITNESSES:

J. Herbert Bradley.

Louis Donata

INVENTOR

John W. Way by Christy and Christy

Atty's

UNITED STATES PATENT OFFICE.

JOHN W. WAY, OF EDGEWORTH, PENNSYLVANIA.

AEROPLANE.

13,397. Specification of Reissued Letters Patent. Reissued Apr. 2, 1912.

Original No. 1,014,731, dated January 16, 1912, Serial No. 528,200. Application for reissue filed February 5, 1912. Serial No. 675,644.

*To all whom it may concern:*

Be it known that I, JOHN W. WAY, residing at Edgeworth, in the county of Allegheny and State of Pennsylvania, a citizen of the United States, have invented or discovered certain new and useful Improvements in Aeroplanes, of which improvements the following is a specification.

In the specification which forms part of another copending application filed November 15, 1909, Serial No. 528,199, I have shown and described a propeller wheel particularly adapted for service in aeroplanes, in which the blade or vane of the propeller is transversely arched and provided on its concave surface with air-retarding projections. The invention which I am about to disclose and make the subject of this application is the employment of this same configuration to the sustaining wings or sails of the aeroplane.

Figure 1:
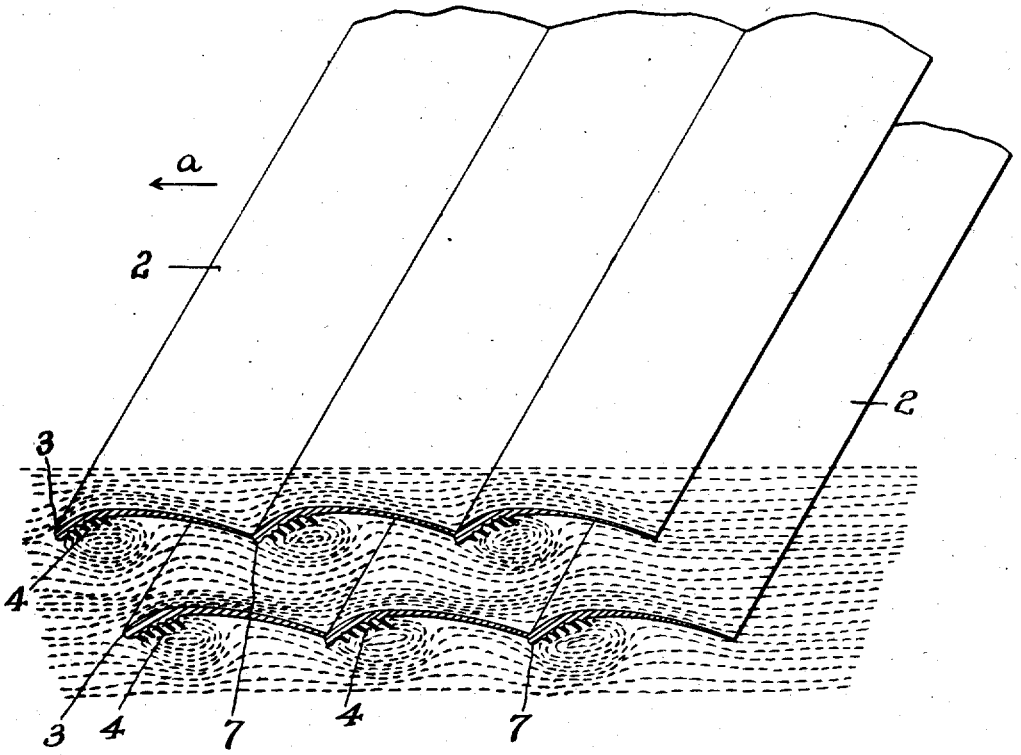
Figure 2:
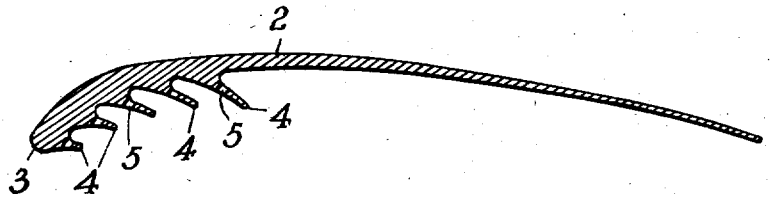

The accompanying drawings illustrate my invention. In them, Figure 1 is a fragmentary view in perspective of two coöperating wings or sails of an aeroplane; and Fig. 2 is a sectional view of a single section.

Each of these wings or sails is composed of a number of sections or parts 2, which are arranged in succession from front to rear, meeting at their edges, and forming the wings or sails. The direction of progress is indicated by the arrow *a*. Each one of the several sections of these sustaining wings or sails is formed with such a contour as I have, in my other application referred to above, described for the blades of a propeller; that is to say, each of these sections is transversely curved, the convex side being the upper side, and the concave side the lower side; the form of curve is preferably spiral, and the arrangement such that the spiral increases in radius from the anterior to the posterior edge of each section. Furthermore, the forward edge of the leading section is rounded; at the point of meeting of adjacent sections there is a protruding rounded edge; and in the concave face of each section and adjacent to the anterior edge thereof are arranged one or more air-retarding projections extending longitudinally of the section and protruding preferably in a rearward direction. These projections are preferably flexible, and are preferably vented for the passage of restricted quantities of air. If there be but one such projection in a section, it will preferably be arranged at the very edge, immediately rearward of the rounded portion 3 or 7; and, if there be more projections than one, they are preferably formed of increasing length from the foremost to the rearmost of the series within a single section.

The forward rounded edge of the leading section is indicated at 3 in the drawing, the projections at 4, and the protruding rounded edge at the point of meeting of adjacent sections at 7. The vents through the projection 4 are preferably in the form of perforations 5.

The entire wing or sail may if preftrred consist of a single section such as I have described above. Such simple wing structure is illustrated in section in Fig. 2 of the drawings. In this case, while the major portion of the wing is rigid the posterior edge (and, in case a plurality of sections are employed, the posterior edge of the rearmost section) will preferably be made flexible.

My invention further resides in a certain cellocation or reltive arrangement of two cooperating wings or sails such as I have described and such as the drawing illustrates. It will be understood that as an aeroplane provided with wings of this particular shape advances in the direction indicated by the arrow *a*, condensation and rarefaction of the air adjacent to the wing surfaces will occur; and it is my object to so arrange the two coöperating wings with respect to one another that such condensation and rarefaction will effect the least possible amount of resistance in the air to the progress of the vessel. To such an end I have found the best relative arrangement to consist in having the succeeding sections of the underlying or lower sail arranged slightly rearward of the corresponding sections of the upper wing or sail. My experiments in this particular respect have led me to believe that the following conditions exist. When the air particles strike the forward rounded edge of the wing they are deflected, some upwardly and some downwardly. Such particles as are deflected upwardly exert their upward or vertical force agaisnt the air passing horizontally over the upper surface of the wing, to the end that a rarefaction is formed over substantially the entire upper surface of the wing, the said rarefaction decreasing from the front to the rear of the said wing. The air particles that are deflected downwardly are subsequently turned upwardly by the air passing below the wing, and are again separated when (in their upward movement) they strike the lower surface of the wing, some moving forwardly more rapidly than the velocity of the advancing wing, and some moving rearwardly. The air particles which move forwardly along the lower surface of the wing strike the projections, and exert their force to move the wing upwardly and forwardly, such effect being facilitated by the previously described rarefaction of the upper surface of the wing. Likewise, the air particles which move rearwardly on the lower surface of the wing, exercise their force on the downwardly sloping surface of the wing to lift it. Such being the conditions of rarefaction and condensation on the upper and lower surfaces, respectively, of the wings, together with their consequent effects, the arranging of one wing in advance of the other will cause a continuous stream of relatively compressed air to flow in wave-like motion from front to rear, the wave-like movement being effective continuously to assist in advancing and levitating the wings. In such arrangement I have found there is the least resistance to the progress of the vessel. In the drawing I have indicated in dotted lines in an approximate manner the action of air between the adjacent wings or sails, in this way illustrating more clearly the relative arrangement of these parts. It will of course be understood that I have found in this particular configuration of the wings or sails, a positive advantage over plain surfaces.

I claim herein as my invention:

1. A sustaining wing for an aeroplane, said wing being of curved contour and having the continuity of its concave surface interrupted at a point rearwardly of but adjacent to its anterior edge by a projection which extends outwardly from the said concave surface, said projection forming with the concave surface a constantly open pocket.

2. A sustaining wing or sail for an aeroplane of curved contour from front to rear, and provided upon its concave surface and adjacent to the anterior edge thereof with a vented air-retarding projection, substantially as described.

3. A sustaining wing or sail for an aeroplane of curved contour from front to rear, and provided upon its concave surface with a series of air-retarding projections, the length of the projections of the series increasing from the foremost rearwardly, substantially as described.

4. A sustaining wing or sail for an aeroplane composed of a plurality of segments arranged edge to edge and united along their adjoining edges, each of said segments being of curved contour in cross section, the posterior edge of the rearmost section being flexible, substantially as described.

5. In an aeroplane, the combination of two supporting wings or sails arranged one above the other, each of said wings or sails consisting of a plurality of arched segments and the said sails or wings being so arranged with respect to one another that a continuous stream of air will move in wave-like motion from the front to the rear of the said wings or sails, substantially as described.

6. A sustaining wing or sail for an aeroplane, composed of a plurality of segments each of curved contour in cross section, convex above and concave below, said segments united edge to edge and arranged with their united edges transverse to the line of motion of said wing or sail, substantialy as described.

In testimony whereof I have hereunto set my hand.

JOHN W. WAY.

Witnesses:
PAUL N. CRITCHLOW,
FRANCIS J. TOMASSON.